(12) United States Patent
Kreitzer

(10) Patent No.: US 7,478,604 B2
(45) Date of Patent: Jan. 20, 2009

(54) APPARATUS AND PROCESS FOR IMPROVING FERTILITY OF A SOIL, TO HELP DETOXIFY HAZARDOUS CHEMICALS IN THE SOIL, AND TO REDUCE EROSION OF THE SOIL

(76) Inventor: William R. Kreitzer, 1011 N. Church St., Gibson City, IL (US) 60936

( * ) Notice: Subject to any disclaimer, the term of this patent is extended or adjusted under 35 U.S.C. 154(b) by 0 days.

(21) Appl. No.: 12/082,355

(22) Filed: Apr. 10, 2008

(65) Prior Publication Data

US 2008/0250992 A1 Oct. 16, 2008

Related U.S. Application Data

(60) Provisional application No. 60/923,026, filed on Apr. 12, 2007.

(51) Int. Cl.
*A01C 5/00* (2006.01)
(52) U.S. Cl. .................. 111/200; 111/900; 111/906
(58) Field of Classification Search .............. 111/200, 111/900, 906, 915, 163–169, 149, 105, 104, 111/100–102; 47/57.5, 58.1
See application file for complete search history.

(56) References Cited

U.S. PATENT DOCUMENTS 5,593,778 A * 1/1997 Kondo et al. ................ 428/373

* cited by examiner

*Primary Examiner*—Christopher J. Novosad
(74) *Attorney, Agent, or Firm*—Tod R. Nissle, P.C.

(57) ABSTRACT

A process and apparatus improves the fertility of soil, helps detoxify hazardous chemicals in the soil, and reduces erosion of the soil. The system provides implantation apparatus for injecting or implanting water and earthworm cocoons in the soil. The depth at which cocoons are implanted is selected. The temperature of the ambient air and soil at the implantation depth is selected. A determination is made with respect to whether the soil is too wet for planting. Physical soil conditions are selected. The soil in which cocoons are being implanted is evaluated to determine the selected physical soil conditions, including the presence of chemicals known to be toxic to earthworms. Worm species are selected to improve selected ones of the soil conditions. Cocoons of the selected worm species are encapsulated. The encapsulated cocoons are placed in the implantation apparatus with water. Openings are made in the soil. The implantation apparatus implants water and cocoons in the openings. After the earthworm cocoons are implanted, care is taken to not apply to the soil chemicals that are known to be toxic to earthworms.

1 Claim, 3 Drawing Sheets

APPARATUS AND PROCESS FOR IMPROVING FERTILITY OF A SOIL, TO HELP DETOXIFY HAZARDOUS CHEMICALS IN THE SOIL, AND TO REDUCE EROSION OF THE SOIL

This application claims priority based on provisional patent application Ser. No. 60/923,026, filed Apr. 12, 2007.

This invention pertains to soil conservation.

In a further respect, the invention pertains to a process and apparatus to improve the fertility of soil while reducing the necessity for fertilizers and pesticides.

The passage of time has witnessed a worsening of soil mineral content and of other physical conditions that are used to evaluate the suitability of soil for growing grass, trees, corn, wheat, and various other crops.

Accordingly, it would be highly desirable to provide an improved process and apparatus for improving soil.

Therefore, it is a principal object of the instant invention to provide an improved method and apparatus to improve soil fertility.

This and other, further and more specific objects and advantages of the invention will be apparent from the following detailed description thereof, taken in conjunction with the drawings, in which.

Briefly, in accordance with the invention, I provide a method to improve the fertility of a soil, to help detoxify hazardous chemicals in the soil, and to reduce erosion of the soil. The method comprises the step of providing worm cocoon injection apparatus. The apparatus comprises a frame; at least one coulter mounted on the frame to form at least one opening in soil; a tank to hold water and earthworm cocoons; an agitator in the tank to prevent the earthworm cocoons from settling to the bottom of the tank; a pump to dispense in the opening produced by the coulter a selected amount of water and cocoons; and, motive power to operate the mixer and the pump. The process also includes the steps of selecting a planting depth in the range of two to six inches; and, determining if the soil is sufficiently dry to inject worm cocoons, if the temperature of the soil at the planting depth is in the range of soil temperature is in the range of about forty-two to eighty degrees F., and if the ambient air temperature is in the range of thirty-three to one hundred degrees F. If the soil is sufficiently dry to inject worm cocoons, if the temperature of the soil at said selected depth is in the range of soil temperature is in the range of about forty-two to eighty degrees F., and if the ambient air temperature is equal to or greater than forty two degrees F., then the process includes the steps of selecting a plurality of soil physical conditions; evaluating the soil to determine the selected soil physical conditions for the soil; selecting at least two species of worms to improve at least one of the selected soil conditions; determining for each of the selected species of worm the quantity of worm cocoons desired per acre of soil; determining that pesticides, fertilizers, and other chemicals harmful to worms are not present in the soil in a concentration sufficient to kill the selected species of worms; providing a selected quantity of worm cocoons of the selected species of worms; providing a selected quantity of water having a temperature in the range of about forty-two to eighty degrees F.; placing the quantity of worm cocoons and the quantity of water in the tank; utilizing the motive power to activate the agitator to prevent the worm cocoons from settling to the bottom of the tank; moving the worm cocoon injection apparatus over the soil such that the disc makes in the soil an opening having the selected depth; and, operating the a pump to dispense in the opening a selected amount of water and cocoons. The process concludes with the step of avoiding use of pesticides, fertilizers, and other chemicals in a concentration sufficient to kill worms hatching from the cocoons.

Figure 1:
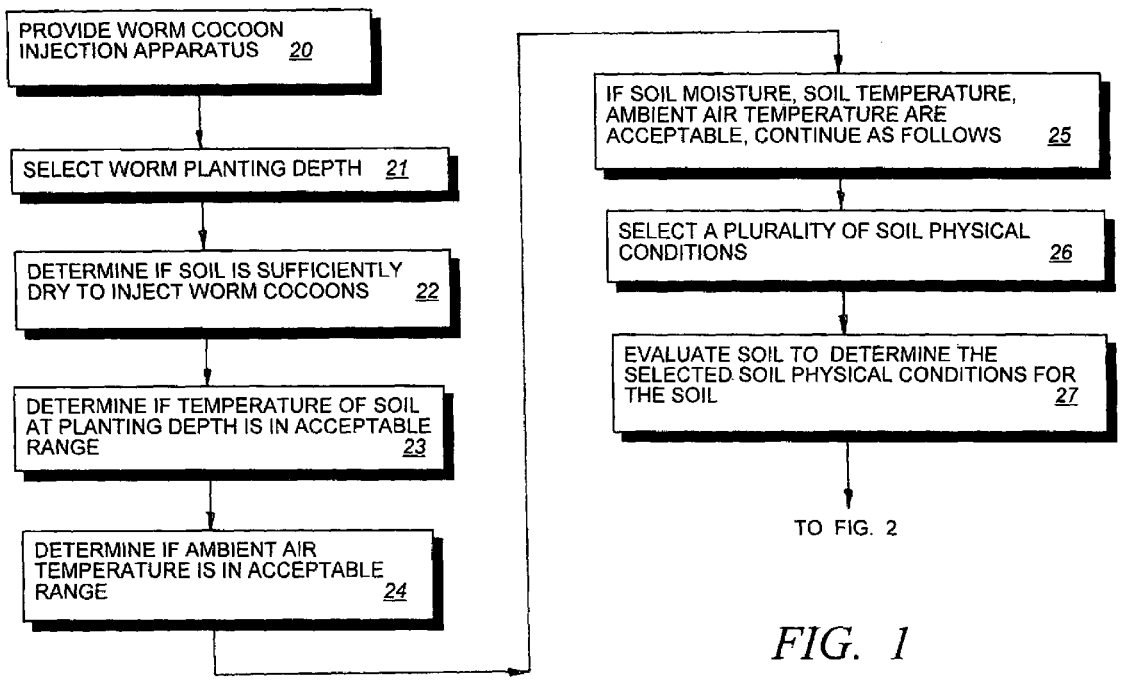
FIG. 1 is a block flow diagram illustrating the first portion of a process in accordance with the principles of the invention.
Figure 2:
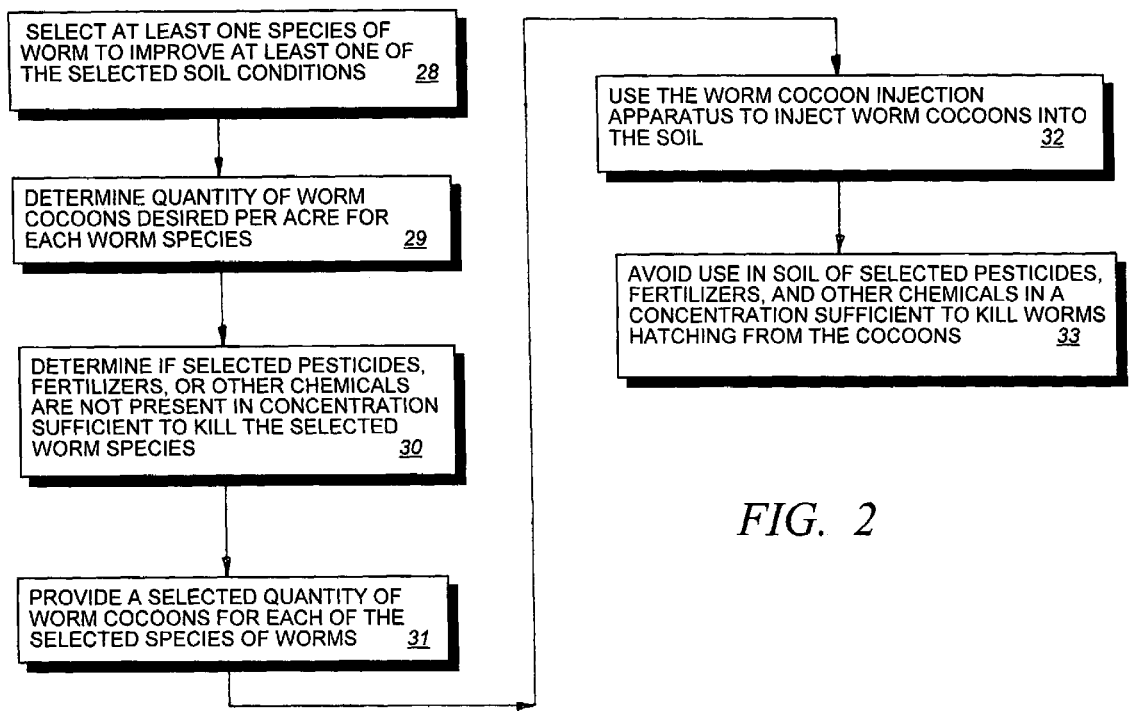
FIG. 2 is a block flow diagram illustrating the second portion of a process in accordance with the principles of the invention; and, FIG. 3 is a block diagram illustrating apparatus which can be utilized in conjunction with the process of the invention.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 and 2 illustrate a process in accordance with the invention, including the step 20 to "provide worm cocoon injection apparatus", step 21 to "select worm planting depth", step 22 to "determine if the soil is sufficiently dry to inject worm cocoons", step 23 to "determine if the temperature of the soil at the planting depth is in an acceptable range", step 24 to "determine if the ambient air temperature is in an acceptable range", step 25 to "if soil moisture, soil temperature, and ambient air temperature in acceptable, continue as follows", step 26 to "select a plurality of soil physical conditions", and step 27 to "evaluate soil to determine the selected soil physical conditions for the soil".

In FIG. 2, the process of FIG. 1 is continued from step 27 and includes step 28 to "select at least one species of worm to improve at least one of the selected soil conditions", step 29 to "determine the quantity of worm cocoons desired per acre to each worm species", step 30 to "determine if selected pesticides, fertilizers, or other chemicals are not present in concentrations sufficient to kill the selected worm species", step 31 to "provide a selected quantity of worm cocoons for each of the selected species of worms", step 32 to "use the worm cocoon injection apparatus to inject worm cocoons into the soil", and step 33 to "avoid use in the soil of selected pesticides, fertilizers, and other chemicals in a concentration sufficient to kill worms hatching from the cocoons."

With respect to step 20, the worm injection apparatus can comprise any desired apparatus for forming an opening in soil to a selected depth to receive one or more worm cocoons, and to place or implant one or more worm cocoons in the opening. Such apparatus can, by way of example and not limitation, include a manually or mechanically operated coring tool or can include the more complicated apparatus set forth in FIG. 3 and described below. Each worm cocoon can be implanted standing alone or in combination with other worm cocoons or with another composition or component such as water, fertilizer, etc.

With respect to step 21, the worm cocoon planting depth is in the range of two to six inches beneath the soil surface, preferably three to five inches beneath the soil surface, and most preferably about four inches beneath the soil surface. The planting depth is important in increasing the likelihood that the cocoon will hatch and the worm survive, particularly since the cocoon likely will be injected without a protective outer coating. I have discovered that planting depths of less than two inches and greater than six inches significantly increase worm morbidity.

With respect to step 22, the soil is too wet if an opening formed in the soil will not close when the opening is four inches deep and tapers from an width of one inch at the surface of the soil to a width of about one-half inch at the bottom of the opening. The opening formed in the soil must close, or be closed, to protect the worm cocoon(s) deposited in the bottom of the opening. Any desired test can be utilized to determine of the soil is too wet. Another "wetness" test is to determine if an opening can be formed in the soil. If the soil is muddy or is otherwise so wet that a coulter or other tool can't form an opening in the soil that will "hold" and retain its shape long enough for a cocoon(s) to be inserted in the opening, then the field is too wet to use such conventional tools and to implant cocoons in the ground. However, it might be possible to device a hypodermic needle-like apparatus that would pierce the ground to a depth of four inches and inject water and earthworm cocoons at a desired depth in such wet soil.

With respect to step 23, the soil temperature at the planting depth is in the range of thirty-three degrees to one hundred degrees F., preferably forty-two to eighty degrees F., and more preferably is about fifty-five degrees F. It is possible that a worm cocoon will hatch when planted at thirty-three degrees F. or one hundred degrees F. However, I have discovered that worm morbidity increases when a cocoon is implanted at a soil temperature of less than forty two degrees F. or at a soil temperature of greater than eighty degrees.

With respect to step 24, the ambient air temperature is in the range of thirty-three to one hundred degrees F. I have discovered that worm morbidity increases when a cocoon is implanted at an ambient temperature of less than forty-two degrees F. or greater than eighty degrees With respect to step 26, any desired soil physical conditions can be selected. Typical physical conditions that are considered, however, include the ability of the soil to permit aeration and drainage to occur (i.e., the porosity of the soil), soil pH, whether vermicomposting is desired, whether significant quantities of animal waste are present in or on the soil, whether burrowing below the frost line is desirable, whether the soil has a high moisture content, and whether the soil has a high organic matter content.

With respect to step 27, after desired soil physical conditions are selected, the particular soil being treated is evaluated to determine said selected physical conditions for that particular soil.

With respect to step 28, after the particular soil physical conditions are evaluated for the soil being treated, at least one species of earthworm is selected to improve at least one of the soil physical conditions. Although any desired earthworm species can be utilized in the practice of the invention, the below Table I indicates some earthworm species and the particular soil conditions that each earthworm species thrives in or is especially useful in improving. It is noted, however, that all earthworm species can, among other things, (1) improve soil fertility by bringing up minerals from the subsurface that are in short supply in surface layers, by creating fertile root channels, by helping to compost residues and waste products, by stimulating microbial populations, and by neutralizing soil pH; (2) improve plant growth and health; (3) suppress weed growth; (4) help clean up dangerous chemical in the environment; and, (5) improve water absorption and prevent erosion.

TABLE I

Earthworm Species and Soil Conditions in Which the Species Performs

| Earthworm Species | Soil Conditions Addressed by Species |
|---|---|
| *Aporrectodea caligninosa* (common pasture earthworm) | Often found in agricultural soils |
| *Dendrobaena veneta* (European night crawler), also known as *Eisenia hortensis* | Performs best in wet environments |
| *Eisenia andrei* (Red tiger worm) | Best suited for vermicomposting |
| *Eisenia foetida* (Manure worm, red wiggler, or tiger worm) | Used where animal waste is present in significant amounts. Often used for composting. Surface worker species; consumes surface fodder. |
| *Lumbricus terrestris* (Dew worm, nightcrawler, or angleworm) | Its burrowing actions makes this earthworm of great value in keeping the soil structure open and in creating a multitude of channels which promote the processes of aeration and drainage. |
| *Lumbricus rubellus* (Red marsh worm) | Commonly found in places rich in organic matters and moisture such as gardens, agricultural soils and pastures. Surface worker species; consumes surface fodder. |
| *Bimastos tumidus* | Often found in compost piles. Tolerates medium C:N ratios and cooler temperatures better than *Eisenia foetida*, multiplies rapidly in old straw and spoiled hay, hardy to Z-5 and survives in ordinary soil conditions and once established survives without extensive preparations. |
| *Pheretima elongata* | Deep burrowing worm. Bigger, stronger and livelier than common species such as red worn (*Esienia foetida*). Efficient organic waste converter. Used to convert garbage into vermicompost. |

By way of example, and not limitation, if the soil being treated in accordance with the process of the invention has less than desirably porosity, has surface fodder comprising dead stalks and leaves from a past crop, and includes manure spread out over the surface of the soil, then the species of worms selected may include *Lumbricus terrestris* (because its burrowing actions open soil structure and create a multitude of channels that promote aeration and drainage), *Eisenia foetida* (to process the manure), and *Lumbricus rubellus* (to consume, as a surface worker species, the surface fodder including dead leaves and stalks from a prior crop).

In one embodiment of the invention, the earthworm cocoons injected or implanted in each acre or other desired area of land include at least two different species of earthworm, preferably at least three different species of earthworm, more preferably at least four different species of earthworm, and most preferably at least five different species of earthworm. The utilization in the same area of land of multiple species of earthworms is believed to provide a unexpected, unpredictable synergism that improves the ability of the worms to perform collectively the various advantageous functions that earthworms provide in conserving soil, including the advantageous functions of aeration, fertilization, erosion prevention, and other functions discussed earlier herein and otherwise known. Some earthworm species are more efficient at aerating soil, other species are more efficient in processing animal waste, and so on.

With respect to step 29, the quantity of worm cocoons of each species placed per acre can vary as desired, but typically is at least 200 cocoons per acre, preferably is at least 300 cocoons per acre, more preferably is at least 600 cocoons per acre, and most preferably is 1000 cocoons per acre. Table II illustrates how the earthworm population in the soil on an acre of land can possibly rapidly propagate. In preparing Table II it is assumed that (1) each mature earthworm produces two (2) cocoons a week, and (2) the initial 300 cocoons implanted in the ground have about a 70% viability rate. The mortality rate of mature earthworms is not taken into account because the average life span of an earthworm is believed to be in the range of four to eight years. Even if a significantly more conservative estimate of earthworm propagation were set forth in Table II, it can be seen that it is possible for an earthworm population to propagate rapidly at an exponential rate. In one embodiment of the invention, an objective of the invention is to obtain an earthworm population of at least 500,000 per acre of soil. When a population of 500,000 earthworms per acre of soil is obtained, it is believed that it will no longer be necessary to apply supplemental fertilizers to the soil, or, that the amount of fertilizer needed will be greatly reduced.

TABLE II

Possible Propagation of Earthworm Population in an Acre of Land

| Month | Initial Injection of Earthworm Cocoons | Mature Worms | Worm Cocoons Produced by Mature Worms |
|---|---|---|---|
| 0 | 300 | 0 | 0 |
| 1 |  | 0 | 0 |
| 2 |  | 0 | 0 |
| 3 |  | 200 | 0 |
| 4 |  | 200 | 1,600 |
| 5 |  | 200 | 1,600 |
| 6 |  | 200 | 1,600 |
| 7 |  | 1,800 | 1,600 |
| 8 |  | 2,400 | 14,400 |
| 9 |  | 4,000 | 19,200 |
| 10 |  | 5,600 | 32,000 |
| 11 |  | 20,000 | 44,800 |
| 12 |  | 39,200 | 160,000 |
| 13 |  | 71,200 | 313,600 |
| 14 |  | 116,000 | 569,600 |
| 15 |  | 276,000 | 928,000 |
| 16 |  | 589,600 | 2,208,000 |

If, for example, a farmer wishes to dispense 300 worm cocoons per acre, he would place 48,000 cocoons in a tank 45 (FIG. 3) along with 500 gallons of water and would use pump 43 to inject into a furrow(s) or other opening(s) in the soil 3.125 gallons of water per acre. If each worm cocoon cost the farmer $0.14, then $30.00 would buy 214 worm cocoons for one acre of land. If each worm cocoon costs $0.05, then $30.00 would purchase 600 worm cocoons for one acre of land.

A trend that has existed for decades is for farmers to employ an arsenal of fertilizers, insecticides, fungicides, fumigants, and other chemicals that kill millions upon millions of earthworms, thereby depriving soil of natural fertilization, aeration, weed control, etc. provided by earthworms. After the earthworm population has been so depleted, farmers turn around and spend millions upon millions attempting to fertilize the soil, control weeds, aerate the soil, etc. This process appears to be one of the most irrational endeavors undertaken by man, akin to processing food to remove vitamins and minerals, and then adding vitamins and minerals back into the processed food to "fortify" the food.

With respect to step 30, a soil is, prior to implanting earthworm cocoons, preferably tested to insure that the soil does not contain a concentration of one or more selected pesticides, fertilizers, or other chemicals that is known to be sufficient to kill or injure the worms in the cocoons or to kill or injure the worms after they hatch from the cocoons. A variety of pesticides, fertilizers, and other chemicals that kill or injure earthworms are well known, as are chemicals that appear to pose minimal, if any, risk to earthworms. Unfortunately, earthworm toxicity data does not exist for many commonly used pesticides that are applied to field crops and other kinds of crops or plants.

Importantly, in accordance with one embodiment of the invention, it is preferred that, after earthworms are implanted in an area of land, chemicals are utilized on the land that have existing earthworm toxicity data that, at a minimum, indicates the chemicals are not toxic or injurious. Further, if possible the data preferably indicates that each non-toxic or non-injurious chemical functions to assist or improve earthworm health and functioning. In addition, if a chemical is utilized for which earthworm toxicity data does not exist, it is preferred that the chemical be at least preliminarily tested in any desired manner to obtain at least preliminary data indicating that the chemical does not appear toxic or injurious to earthworms.

One important factor in determining the toxicity of a chemical to earthworms is how the chemical is applied to land, i.e., what is the normal concentration of the chemical, what is the time of day when the chemical is applied (better to apply a chemical at times of day when it is less likely earthworms will be at the soil surface), where the chemical is applied (is it applied primarily to plants, or primarily in soil furrows). Application of insecticides "in furrow" appears to produce lower earthworm mortality than applying insecticides "band" or "broadcast". Seed treatment also reduces earthworm mortality from insecticides.

Table III below indicated herbicides with no known significant toxicity to earthworms when applied at normal field rates.

TABLE III

Herbicides With No Known Significant Toxicity to Earthworms When Applied at Normal Field Rates

| Common Name | Trade Name (TM) |
|---|---|
| Amitrole | Amino Triazole, Amizol |
| Asulam | Asulox |
| Atrazine | Aatrex, Atrazine |
| Bromacil | Hyvar X |
| Chlorpropham | Furloe |
| Dalapon | Dalapon, Dowpon |
| Diphenamid | Dymid, Enide |
| Diuron | Diuron, Karmex |
| Endothall | Endothal, Hydout |
| Glyphosate | Roundup |
| Hexazisome | Velpar |
| Linuron | Lorox, Linex |
| MCPB | Can-Trol, Thistrol |
| Metribuzin | Lexone, Sencor |
| Monuron | Urox |
| Ocadiazon | Ronstar |
| Paraquat | Ortho Paraquat |
| Prometryn | Caparol |
| Propacalor | Ramrod, Bexton |
| Propazine | Milogard |
| Propham | Chem Hoe |
| Simazine | Princep, Aquazine |
| TCA | Sodium TCA Weedkiller |
| Terbacil | Sinbar |
| Triluralin | Treflan |

Table IV indicates the known toxic effects to earthworms of some insecticides, nematicides, and acaricides.

TABLE IV

Known Toxic Effects to Earthworms of Some Insecticides, Nematicides, and Acaricides

| Class [Common Trade Name (TM)] | Toxicity |
|---|---|
| Organochorines (no longer registered for use) | |
| Aldrin | Low |
| Chlordane | High |
| DDT | Low |
| Cieldrin | Low |
| Endrin | Variable |
| Heptachlor | High |
| Isobenzan | Variable |
| Toxaphene | High |
| Organophosphous | |
| Chlorpyrifos (Lorsban) | None |
| Chlorfenvinphos (Apachlor) | Low |
| Disulfoton (Disulfoton) | Low |
| Fonofos (Dyfonate) | Moderate to High |
| Ethoprop (Mocap) | High |
| Fenamiphos (Nemacur) | Low |
| Fenitrothion (Fenitrothion) | Low |
| Fensulothion (Dasanit) | High |
| Isophenphos (Amaze) | None |
| Malathion (Cython) | None |
| Parathion (Alkron) | Moderate |
| Phorate (Thimet) | High |
| Phosalone (Rubitox) | None |
| Terbufos (Counter) | None |
| Trichlorfon (Trinex) | None |
| Carbamates | |
| Aldicarb (Temik) | High |
| Cararbyl (Sevin) | High |
| Carbofuran (Furadan) | High |
| Methonmyl (Lannate) | High |
| Oxamyl (Oxamyl) | High |
| Propoxure (Baygon) | High |

Table V sets forth known toxic effects on earthworms of some fungicides.

TABLE V

Known Toxic Effect on Earthworms of Some Fungicides

| Common Name [Trade Name (TM)] | Toxicity |
|---|---|
| Benomyl (Benlate) | High |
| Binapacryl (Morocide) | None to Low |
| Carbendzim (BCM) | High |
| Copper Oxychloride (COCS) | High |
| Thiabendizole (TBZ) | High |
| Thiophanate-methyl (Mildothane) | High |

Table VI sets forth known toxic effects on earthworms of some fumigants.

TABLE VI

Known Toxic Effects on Earthworms of Some Fumigants

| Common Name [Trade Name (TM)] | Toxicity |
|---|---|
| Chloropicrin (Larvacide) | High |
| Dazomet (Micofume) | High |
| Dichloropropene (Telone) | High |
| Metham Sodium (Vapam) | High |
| Methybromide (Bedfume) | High |

Ammonium sulfate, lead arsenate, and mercuric chloride are highly toxic to earthworms. Ammonium sulfate, a nitrogen fertilizer, is toxic to earthworms only in acid soils. The bacterium *Bacillus thuringiensis* has been used to control some insects. It apparently has little or no adverse effect on earthworms when applied as a foliar spray at accepted application rates. Earthworm fatalities have been, however, shown in laboratory studies.

With respect to step 31, the quantity of worm cocoons determined in step 29 is, for each acre of soil to be treated, provided.

Figure 3:
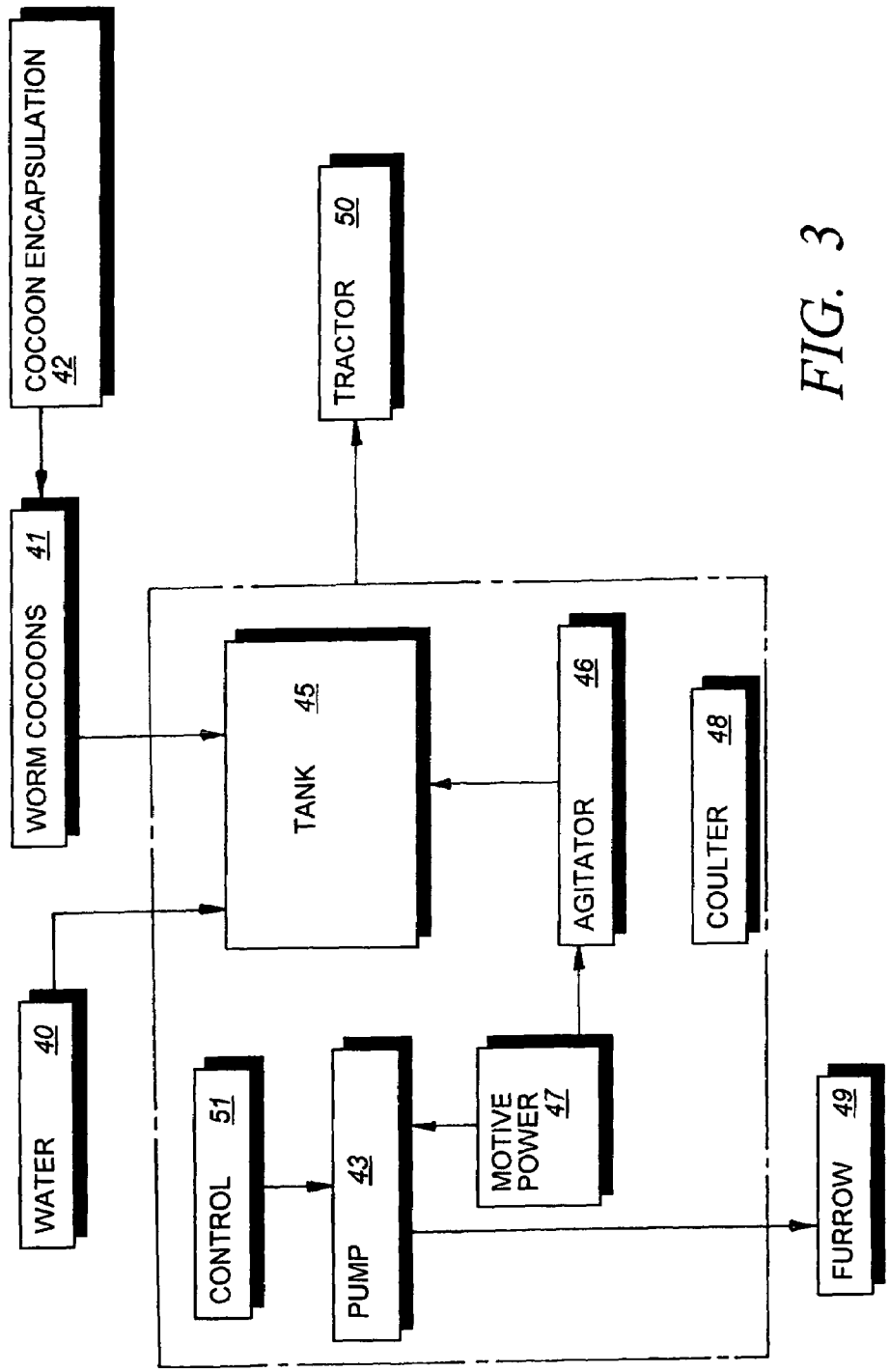

With respect to step 32, the injection apparatus of FIG. 3, or other desired injection apparatus, is utilized to insert the worm cocoons in the soil With respect to step 33, after the worm cocoons are inserted in the soil, it is important to avoid utilizing pesticides, fertilizers, and other chemicals in the soil at a concentration that would kill the worms. It is also desirable to avoid utilizing pesticides, fertilizers, and other chemicals in the soil in a concentration at would sicken or otherwise harm the worms. Preferably, chemicals are utilized that help worms thrive and that injure or kill worm predators like *Artiophosthia triangulata* and *Australoplana sanguinea* flatworms.

Worm cocoon injection apparatus is illustrated in FIG. 3 and includes tank 45, tank agitator 46, pump 43, motive power 47, coulter 48, and control 51. The worm cocoon injection apparatus is pulled or pushed over the soil surface in a field by tractor 50 or another apparatus. Control 51 operates pump 43 and can comprise something as simple as an on/off switch or a more complicated microprocessor that can be programmed to dispense water and admixed worm cocoons from tank 45 at a constant or variable rate depending on, for example, the rate at which tractor 50 moves the injection apparatus over the top soil in a field. A battery or other motive power 47 provides motive power to operate pump 43, control 51 (if necessary), and agitator 46. Agitator 46 gently stirs the water or other liquid(s) in tank 45 to prevent worm cocoons from settling to the bottom of tank 45, and to facilitate removal of the encapsulating coating on each cocoon. When the worm cocoons 41 are inserted in tank 45, they preferably are encapsulated to facilitate handling of the cocoons prior to being inserted in tank 45. Once the cocoons are inserted in tank 45, the coating typically dissolves. Various processes for coating worm cocoons with histosol soil and other compositions are known in the art and are not set forth herein. Uncoated worm cocoons can, if desirable, be inserted along with water in tank 45 and dispensed from tank 45 into soil. It is rather presently preferred to utilize cocoons that are encapsulated with a water soluble coating.

In use of the apparatus of FIG. 3, worm cocoons are encapsulated 42. Cocoons 41 and water 40 are inserted in tank 45. Agitator 45 is operated to maintain the cocoons in suspension and in a generally equal concentration throughout the water in tank 45. Tractor 50 is operated to pull the injection apparatus over the soil in the field such that coulter 48 (or any other desired apparatus) creates a furrow(s) 49 or other openings of desired depth and shape and dimension in the soil. Control 51 operates pump 43 to inject water and worm cocoons into the furrow 49. Furrow 49 is closed to cover the cocoons deposited in the furrow 49 by pump 43. Furrow 49 may be closed by any desired means. One method is to make the furrow 49 with a coulter 48 such that the walls of the furrow collapse inwardly as soon as the cocoons are inserted. Another method of closing the furrow 49 is to drag over the ground a chain mesh or other tool(s) that move dirt into the furrow 49 to fill the furrow 49 and cover the cocoons in the furrow. Injecting worm cocoons into soil with water increases the viability of the cocoons by providing an environment in which the soil adjacent to cocoon has a favorable moisture content.

In one embodiment of the invention, tank 45 is pressurized with air to facilitate the injection of water and worm cocoons into soil. One advantage of an air pressurized tank is that it can eliminate or minimize the number of worm cocoons that are sheared (and destroyed) when certain types of pumps 43 are utilized.

Having described my invention in such terms as to enable those of skill in the art to understand and use it, and having described the presently preferred embodiments and best mode thereof,

I claim:

1. A method to improve the fertility of a soil, to help detoxify hazardous chemicals in the soil, and to reduce erosion of the soil, comprising the steps of
    (a) providing worm cocoon injection apparatus comprising
        (i) a frame,
        (ii) at least one coulter mounted on the frame to form an opening in soil,
        (iii) a tank to hold water and earthworm cocoons,
        (iv) a mixer in said tank to prevent the earthworm cocoons from settling to the bottom of said tank,
        (v) a pump to dispense in the opening produced by said coulter a selected amount of water and cocoons,
        (vi) motive power to operate said mixer and said pump;
    (b) selecting a planting depth in the range of two to six inches;
    (c) determining if
        (i) the soil is sufficiently dry to inject worm cocoons,
        (ii) the temperature of the soil at said planting depth is in the range of soil temperature is in the range of about forty-two to eighty degrees F, and
        (iii) the ambient air temperature is in the range of thirty-three to one hundred degrees F;
    (d) if the soil is sufficiently dry to inject worm cocoons, if the temperature of the soil at said selected depth is in the range of soil temperature is in the range of about forty-two to eighty degrees F, and if the ambient air temperature is equal to or greater than forty two degrees F,
        (i) selecting a plurality of soil physical conditions;
        (ii) evaluating the soil to determine said selected soil physical conditions for the soil;
        (iii) selecting at least two species of worms to improve at least one of said selected soil conditions;
        (iv) determining for each of said selected species of worm the quantity of worm cocoons desired per acre of soil;
        (v) determining that pesticides, fertilizers, and other chemicals harmful to worms are not present in the soil in a concentration sufficient to kill said selected species of worms;
        (vi) providing a selected quantity of worm cocoons of said selected species of worms;
        (vii) providing a selected quantity of water having a temperature in the range of about forty-two to eighty degrees F;
        (vi) placing said quantity of worm cocoons and said quantity of water in said tank;
        (vii) utilizing said motive power to activate said mixer to prevent the worm cocoons from settling to the bottom of the tank;
        (viii) moving said worm cocoon injection apparatus over the soil such that said disc makes in the soil an opening having said selected depth;
        (ix) operating said a pump to dispense at selected positions along the slit, before the slit closes, a selected amount of water and cocoons; and,
    (e) avoiding use of pesticides, fertilizers, and other chemicals in a concentration sufficient to kill worms hatching from the cocoons.

\* \* \* \* \*